United States Patent
Krammer et al.

(10) Patent No.: US 8,435,586 B2
(45) Date of Patent: May 7, 2013

(54) USE OF ALKOXYLATED FLAVONES TO INTENSIFY THE SENSORY IMPRESSION OF ALCOHOL

(75) Inventors: Gerhard Krammer, Holzminden (DE); Günter Kindel, Höxter (DE); Stephan Trautzsch, Holzminden (DE); Uwe Schäfer, Ottenstein (DE)

(73) Assignee: Symrise AG, Holzminden (DE)

( * ) Notice: Subject to any disclaimer, the term of this patent is extended or adjusted under 35 U.S.C. 154(b) by 861 days.

(21) Appl. No.: 12/338,203

(22) Filed: Dec. 18, 2008

(65) Prior Publication Data
US 2009/0162510 A1 Jun. 25, 2009

(30) Foreign Application Priority Data
Dec. 21, 2007 (DE) .................... 10 2007 055 909

(51) Int. Cl.
*A23L 1/22* (2006.01)
(52) U.S. Cl.
USPC ............................ 426/536; 426/534; 426/592
(58) Field of Classification Search .................. 426/534, 426/536, 538, 590, 592, 650
See application file for complete search history.

(56) References Cited

U.S. PATENT DOCUMENTS 5,580,545 A * 12/1996 Washino et al. ................ 424/49
5,866,608 A * 2/1999 Kurtz et al. .................... 514/568

FOREIGN PATENT DOCUMENTS

| DE | 10222883 | 7/2003 |
| EP | 0605261 | 7/1994 |
| RU | 2018523 | 8/1994 |
| RU | 2091471 | 9/1997 |
| RU | 2093556 | 10/1997 |
| WO | WO-2005044778 | 5/2005 |
| WO | WO-2007013811 | 2/2007 |

OTHER PUBLICATIONS

Dugo Paola et al: "On the genuineness of citrus essential oils. Part XLVI. Polymethoxylated flavones of the non-volatile residue of Italian sweet orange and Mandarin essential oils" Flavour and Fragrance Journal, Bd. 9, Nr. 3, 1994, Seiten 105-111, XP002523555, ISSN: 0882-5734, Tabelle 3.

Manthey J A et al: "Concentrations of hesperidin and other orange peel flavonoids in citrus processing byproducts" Journal of Agricultural and Food Chemistry, Amercan Chemical Society, Washington, US, Bd. 44, Nr. 3, Jan. 1, 1996, Seiten 8111-814, XP002295553, ISSN: 0021-8561, Tabelle 1.

* cited by examiner

*Primary Examiner* — Leslie Wong
(74) *Attorney, Agent, or Firm* — Novak Druce Connolly Bove + Quigg LLP

(57) ABSTRACT

The present application relates to a use of a compound of Formula I or of a mixture of compounds of Formula I:

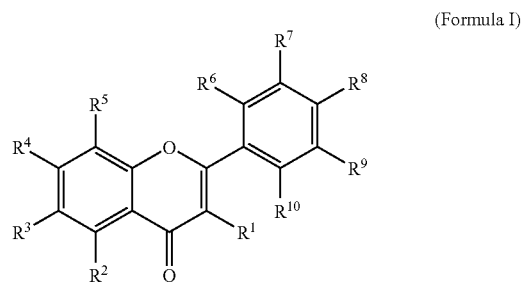

(Formula I)

wherein $R^1$ to $R^{10}$ each independently of one another represent H, methoxy or ethoxy and
at least one of the radicals $R^1$ to $R^{10}$ represents methoxy or ethoxy to intensify the sensory impression of alcohol.

16 Claims, No Drawings

USE OF ALKOXYLATED FLAVONES TO INTENSIFY THE SENSORY IMPRESSION OF ALCOHOL

CROSS-REFERENCE TO RELATED APPLICATION

This application claims benefit of priority to DE 10 2007 055 909.9, filed on Dec. 21, 2007, which is incorporated herein by reference in its entirety.

The invention relates to the use of specific alkoxylated flavones to intensify the sensory impression, in particular the flavor impression, of alcohol (ethanol). It further relates to liquid mixtures comprising ethanol and specific alkoxylated flavones, said flavones being contained in an amount so as to intensify the sensory impression, in particular the flavor impression, of alcohol. The invention also relates to a method for producing an intensified sensory, in particular flavor, impression of ethanol and to a method for producing a beverage or a solid food product having an intensified sensory, in particular flavor, impression of ethanol.

Alcohol (ethanol), as a flavor-imparting component or as a component which contributes to the overall sensory impression, in particular to the overall flavor impression, is contained in a large number of foods, candies and in particular beverages. In this case, it is desirable to achieve a specific alcohol sensory impression, in particular flavor impression, using as little ethanol as possible. The reasons for this are for example the negative side effects of alcohol and, in particular in beverages, also aspects concerning taxation, as in many countries goods are taxed as a function of their alcohol content.

Accordingly, it was the object of the present invention to disclose agents allowing the typical sensory, in particular the flavor, impression of alcohol to be intensified. Preferably, these agents should themselves be flavor-neutral and food product-compatible.

According to the invention, this object is achieved by the use of a compound of Formula I

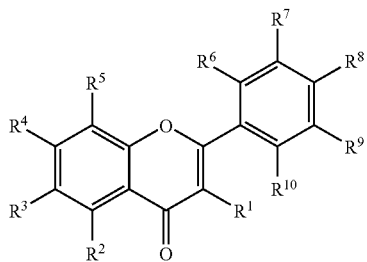

(Formula I)

wherein $R^1$ to $R^{10}$ each independently of one another represent H, methoxy or ethoxy and
at least one of the radicals $R^1$ to $R^{10}$ represents methoxy or ethoxy
to intensify the sensory impression, in particular the flavor impression, of alcohol.

Flavones are important fruit dyes. At the same time, owing to their phenolic character, they are good antioxidants and can for example stabilize the L-ascorbic acid in fruit. A number of physiological properties are attributed to flavones. They are and always have been part of extensive research work. This applies in particular also to polymethoxylated flavones which are found in particular in citrus fruits. A known source of flavones polymethoxylated in this way is orange peel oil.

Typical polymethoxylated flavones contained therein are 4',5,6,7-tetramethoxyflavone (tetra-O-methylscutellarein, cf. Formula V below), 4',5,6,7,8-pentamethoxyflavone (tangeretin, cf. Formula III below), 3',4',5,6,7-pentamethoxyflavone (sinensetin, cf. Formula VI below), 3',4',5,6,7,8-hexamethoxyflavone (nobiletin, cf. Formula IV below), 3,3',4',5,6,7,8-heptamethoxyflavone (hepta-3, cf. Formula II below). A further basic component is 3,3',4',5,6,7-hexamethoxyflavone (hexamethoxyquercetagetin).

EP 0 605 261 discloses an intensified effect of specific flavones on specific flavor notes. Some of the flavones described in the aforementioned document also come under general Formula I. However, there is no indication that the flavones described therein are able to intensify the sensory impression, in particular the flavor impression, of alcohol. This surprising effect is a basic part of the invention described in the present document.

In this regard, within the scope of the present application, the term "alcohol" is, unless otherwise indicated, equivalent to the term "ethanol".

Within the scope of the present application, the term "intensifying the flavor impression of alcohol" refers to the fact that it is possible for a test panel reproducibly to ascertain that a given alcohol concentration mixed with an alcohol flavor-intensifying compound (a compound having general Formula I) produces a flavor impression with regard to the typical ethanol flavor that (apparently) corresponds to a higher concentration of alcohol.

In the use according to the invention, use is preferably made of a compound of general Formula I, wherein $R^6$ and $R^{10}$ are equivalent to H and/or the radicals $R^1$ to $R^{10}$ represent methoxy or H and/or at least 2, 3, 4, 5, 6, 7 or 8 of the radicals $R^1$ to $R^{10}$ represent methoxy. Preferred are compounds of Formula I, wherein $R^6$ and $R^{10}$ are equal to H and at least 4, 5, 6 or 7 of the radicals $R^1$ to $R^{10}$ represent methoxy.

Preferred according to the invention is a use according to the invention, wherein at least one compound of Formula I is selected from the group consisting of compounds of Formulae II to VI:

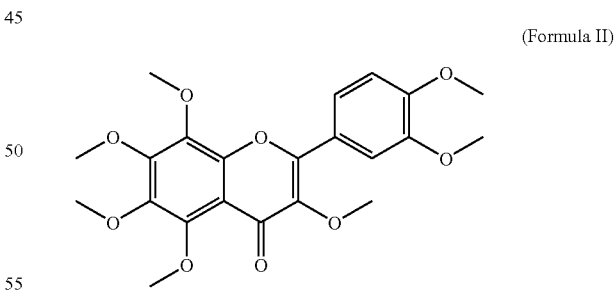

(Formula II)

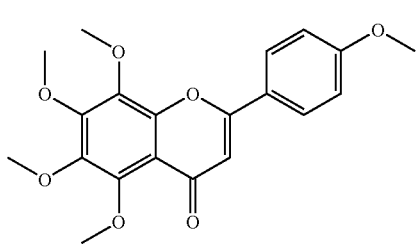

(Formula III)

(Formula IV)

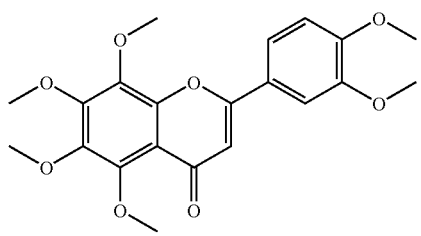

(Formula V)

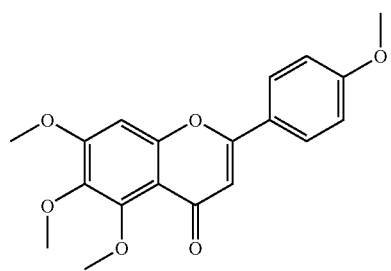

(Formula VI)

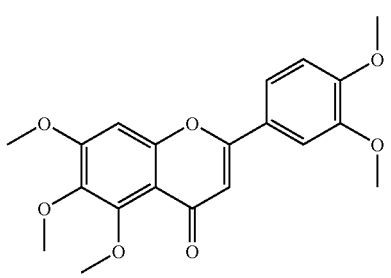

In this case, it has been found that amounts (i.e. the total content) of the compound(s) of Formula I from 1 to 20 ppm, preferably 1 to 15 ppm, more preferably 2 to 10 ppm, even more preferably 5 to 10 ppm, based on the resulting overall mixture (including further constituents) are particularly suitable for the use according to the invention, as the alcohol-intensifying effect is in this case very marked.

In addition, ethanol contents based on the volume of the resulting overall mixture of from 0.5 to 50% by volume, preferably 1.5 to 40% by volume, more preferably 2.5 to 30% by volume, even more preferably 2.5 to 20% by volume, have proven to be particularly suitable proportions of alcohol.

In this case, compound 3,3',4',5,6,7,8-heptamethoxyflavone (Formula II) to be used in accordance with the invention has proven most particularly preferable, as this displays the most marked alcohol-intensifying effect of the compounds of Formula (I). In order to achieve the effect according to the invention to a particular degree, the content of 3,3',4',5,6,7,8-heptamethoxyflavone (Formula II) should be preferably at least 30% by weight, more preferably at least 40% by weight, even more preferably at least 50% by weight, most preferably at least 60% by weight, in each case based on the total weight of the compounds of Formula I.

Low Alcoholic Drinks (LADs)

Low alcoholic drinks are beverages having an alcohol content of from 0.5 to 15% by volume; these can include specifically beer, wine, mixed beer beverages, alcopops, instant alcopops and mixed wine beverages which are offered as a ready-to-drink beverage or instant beverage preparation to be consumed for pleasure.

LADs comprise inter alia products which were obtained purely by fermentation of plants or specific plant parts, such as for example wine or beer. The alcohol in LADs can also originate from the direct addition of alcohol to the product. LADs can furthermore be mixed products made up of an alcoholic part obtained by fermentation, such as for example wine or beer, and a non-alcoholic proportion such as for example lemonades. The lemonade proportion consists conventionally of sweeteners, flavoring agents, acidifying agents, dyes and vitamin additives in differing proportions by weight. The sweeteners used include fructose, glucose, sucrose, for low-calorie beverages also artificial sweeteners such as acesulfame, aspartame, saccharin or cyclamate or hesperetin (sweetness-enhancer) as individual substances or in combination. The flavor-imparting constituents consist generally of fruit juice proportions, essential oils, recombinants, extracts from drugs or individual aromatic or flavoring substances. The acidifying agents added are often citric acid, phosphoric acid, succinic acid and fumaric acid or other approved acidifying agents. In some cases, LADs are also mixed with dyes such as for example caramel, sugar coloring, plant extracts or other approved dyes. In order to increase the physiological value of a beverage, vitamins, for example vitamin A, B, C or E, can also be added.

The combinations of from 0.5 to 15% by volume of alcohol, preferably comprising 2.5 to 8% by volume of alcohol, to which a total amount of from 2 to 20 ppm, preferably 2 to 15 ppm of compounds of Formula I are added, have proven particularly preferable in terms of flavor and the desired alcohol-intensifying effect. Further preferred, depending on the type of beverage and the alcohol content thereof, are compounds of Formula I, in particular of Formulae II to VI, in a total amount of from 2 to 5 ppm or from 5 to 15 ppm.

Medium Alcoholic Drinks (MADs)

Medium alcoholic drinks are beverages having an alcohol content of between 15 and 30% by volume. Specific examples of MADs include liqueurs which can be obtained for example by maceration of plants or plant parts with subsequent filtration or distillation. Further examples of MADs include mixed spirits beverages, fruit wines, liqueur wines, and also other beverages, the alcohol of which was obtained by fermentation and subsequent distillation.

MADs can also be mixed products of alcoholic beverages, such as for example fruit wines or herb liqueurs, to which rounding substances were added.

The rounding substances used are conventionally sweeteners, aromatic substances, flavoring substances, acidifying agents, dyes in differing proportions by weight. The sweeteners used are fructose, glucose, sucrose but also artificial sweeteners such as acesulfame, aspartame, saccharin, cyclamate or hesperetin as individual substances or in combination. Aromatic and flavoring substances can be essential oils, extracts from drugs or individual substances. The acidifying agents added are usually citric acid, phosphoric acid, succinic acid and fumaric acid or other approved acidifying agents. In some cases, MADs are also mixed with dyes such as for example caramel, sugar coloring, plant extracts or other approved dyes.

At an alcohol content of between 15 and 30% by volume, preferably 15 to 20% by volume (such as may be found for example in conventional commercial liqueurs), preferably an addition of 2 to 10 ppm, more preferably from 4 to 6 ppm will be selected. In this addition of compounds of Formula I, in particular of Formulae II to VI, an advantageously intensified ethanol flavor impression is achieved in these beverages.

High Alcoholic Drinks (HADs)

High alcoholic drinks are beverages having an alcohol content of greater than 30% by volume; examples of these include vodka, rum, whisk(e)y, tequila, fruit brandies or ryes. Preferably, they have an alcohol content in the range of from 30 to 50% by volume.

HADs can contain rounding substances. The rounding substances used are conventionally sweeteners, aromatic substances, flavoring substances, acidifying agents, dyes in differing proportions by weight. The sweeteners used are fructose, glucose, sucrose, but also artificial sweeteners such as acesulfame, aspartame, saccharin, cyclamate or hesperetin as individual substances or in combination. Aromatic and flavoring substances can be essential oils, extracts from drugs or individual substances. The acidifying agents added are usually citric acid, phosphoric acid, succinic acid and fumaric acid or other approved acidifying agents. In some cases, HADs are also mixed with dyes such as for example caramel, sugar coloring, plant extracts or other approved dyes.

At alcohol contents of 30 or more % by volume, in particular of from 30 to 50% by volume of alcohol (such as may be found for example in conventional commercial spirits), the proportion of compounds of Formula I is preferably in the range of from 1 to 5 ppm, more preferably in the range of from 1 to 2 ppm. At these additions, the compounds of Formula I, in particular of Formulae II to VI, achieve a particularly advantageous intensification of the ethanol flavor impression.

Also part of the invention is a liquid mixture comprising ethanol and a compound of Formula I or a mixture of compounds of Formula I:

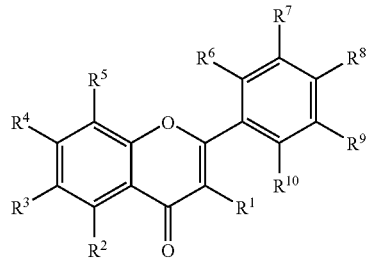

(Formula I)

wherein $R^1$ to $R^{10}$ each independently of one another represent H, methoxy or ethoxy and
  at least one of the radicals $R^1$ to $R^{10}$ represents methoxy or ethoxy and wherein
the ethanol content based on the volume of the liquid mixture is 0.5 to 50% by volume and the total amount of compounds of Formula I based on the liquid mixture is 1 to 20 ppm, preferably 1 to 15 ppm,
on the condition that the mixture comprises no orange juice.

It is also preferable that the liquid mixture according to the invention comprises no juice from citrus fruits. In this case, the term "orange juice" and the term "juice from citrus fruits" include (if appropriate merely diluted) juices originating substantially from the corresponding fruits and juices from juice concentrates of the respective fruits in question.

Preferred is a liquid mixture according to the invention, comprising the above-described preferred variants of the compound of Formula I, in particular wherein the compounds of Formula I are substantially one or more compounds of Formulae II to VI

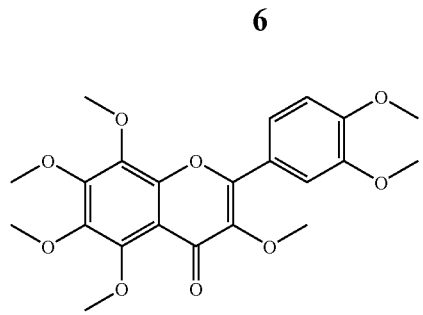

(Formula II)

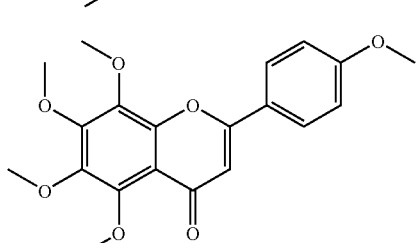

(Formula III)

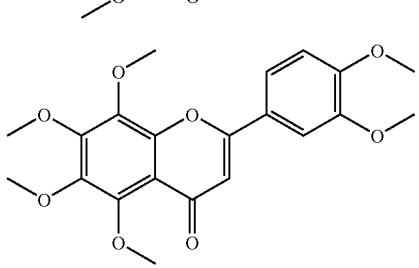

(Formula IV)

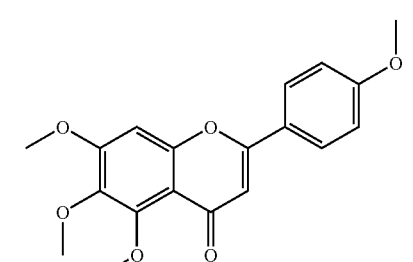

(Formula V)

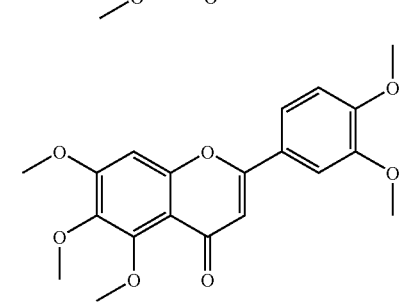

(Formula VI)

compounds of Formula II being most particularly preferred.

Preferred liquid mixtures according to the invention are mixtures which are a beverage intended for human consumption.

Preferred beverages are in this case beer, light beer, mixed beer beverages, mead, sparkling wines, wines, mixed wine beverages, spirits such as alcopops, brandies, cocktails, long drinks, liqueurs and liqueur wines. The present invention allows the (in each case conventional) alcohol content to be reduced in all alcohol-containing beverages on addition in accordance with the invention of the compounds of Formula I without altering the overall flavor impression which is felt to be conventional (in particular including the alcohol flavor impression).

In the sense of the present application, beverages intended for human consumption are simply those which may be sold to end consumers under German food product law. Contaminated beverages, in particular, do not come under the aforementioned definition.

Also part of the invention are candies comprising a liquid mixture according to the invention. Conventionally, the candies according to the invention are filled products such as for example pralines which are filled with liqueur, brandy or the like. The candies according to the invention can however also be sweets.

Also part of the invention is a method for producing an intensified ethanol flavor impression, including the steps of
a) preparing ethanol or an ethanol-containing mixture,
b) adding a compound of Formula I or a mixture of compounds of Formula I in an amount so as to intensify the flavor impression of ethanol,
on the condition that in step b) no orange juice, preferably no juice from citrus fruits is used.

Also part of the invention is a method for producing a beverage or a solid food product, including a method according to the invention for producing an intensified ethanol flavor impression. In principle, the use according to the invention can nevertheless be used in production with a flavored alcohol component. This thus applies also to bakery products or other food products no longer comprising any liquid constituents.

Preferred flavones of general Formula I to be used in accordance with the invention can in this case be obtained for example from commercially available flavone mixtures. Particularly preferred are in this connection commercial polymethoxyflavone mixtures which have been obtained from orange peel oil. It is thus possible to purify for example commercially available qualities of polymethyoxyflavones (PMFs) having a flavone content of 60, 80 or more % by weight, wherein compounds of Formulae II to VI can in particular be obtained.

The following examples serve to characterize the present invention in greater detail, but not to limit it. Unless otherwise stated, all particulars relate to weight.

EXAMPLE 1

Enrichment of Polymethoxyflavones (PMFs)

Starting from a commercial PMF quality having a flavone content of 60% by weight after HPLC, which was obtained from *citrus sinensis* (oranges), the main component 3,3',4',5, 6,7,8-heptamethoxyflavone (HMF, corresponding to Formula II) was obtained in highly pure form by extractive enrichment.

The starting material had an HMF flavone content of 90%, tangeretin 4%, nobiletin 2% and tetra-O-methylscutellarein 1%, based on the overall proportion of flavone. Further flavones were also present in smaller amounts. The quantitative ratio of the flavones in the flavone proportion of the PMF quality used was determined by gas chromatography (GC).

First Enrichment Step:
100 ml of a 1:1 ethanol/water mixture were heated to 80° C. in a water bath while stirring and 12 g of the prescribed starting material (PMF 60) were added and the mixture was subsequently stirred for 15 minutes. There resulted a dark brown-colored, cloudy solution. Undissolved particles contained in the mixture were filtered out with the aid of a glass frit. Subsequently, the filtrate was cooled down; at room temperature, certain crystals of the starting product were added for seeding and the filtrate was stored for 24 hours at 5° C.

Subsequently, flavones which had crystallized out were removed by suction filtration, washed twice with 20 ml of ethanol in each case and subsequently dried in a drying cupboard at 50° C. for 30 minutes. HPLC revealed 87% by weight of the resulting flavone mixture to consist of HMF (HMF87).

Second Enrichment Step (Obtaining of HMF in Highly Pure Form):
The quality HMF87 obtained from the first enrichment step was further enriched by recrystallisation twice with a mixture of methanol and water at a ratio of 65:35. This allowed HMF to be obtained in highly pure form (HPLC purity≧99% by weight) (HMF99).

EXAMPLE 2

Tasting of Mixed Ethanol and Heptamethoxyflavone (HMF)-Containing Mixtures

The test matrix used was a 5% sucrose solution having alcohol contents of 4 and 10% by volume respectively. Added to each of the two sucrose solutions were
a) nothing,
b) 2 ppm of HMF87 from Example 1,
c) 2 ppm of HMF99 from Example 1,
d) 5 ppm of HMF87 from Example 1 and
e) 5 ppm of HMF99 from Example 1.

All of these solutions were tasted by an expert panel consisting of five experts in each case. The experts agreed that they could detect a highly significant intensification of the alcohol impression in the samples containing HMF, in each case compared with the samples without HMF and with the same alcohol content.

There was found to be no significant difference between the factions HMF87 and HMF99.

EXAMPLES 3-6

Application Examples

A panel of consumers tasted the beverages to be tested, seeking to assess in particular the differing alcoholic flavor and also any further additional flavor notes compared to a reference sample.

The reference used was in each case the respective basic beverage without the addition of the PMF mixture PMF84 (from *Citrus sinensis* (oranges)) which comprised the following composition of PMFs of Formula I (HPLC contents):
51.9% by weight of 3,5,6,7,8,3',4'-heptamethoxyflavone (Formula II)
27.9% by weight of nobiletin (Formula IV)
2.7% by weight of tangeretin (Formula III)
1.5% by weight of sinensetin (Formula VI)
In each test series of Examples 3 to 6 the following samples were tasted, the following proportions of PMF84 being added in each case to the reference sample:
a) 0 ppm (=reference sample),
b) 1 ppm of PMF 84,
c) 2 ppm of PMF84,
d) 5 ppm of PMF 84,
e) 10 ppm of PMF 84,
f) 20 ppm of PMF 84.

The panel of consumers was offered a reference sample and 5 coded samples (corresponding to b) to f)), wherein the flavor of the coded samples was to be tasted compared to that of the reference sample. The intensity of the alcoholic flavor of the respective reference sample was defined by "zero", the coded samples were classified on a scale of from 0 (=no difference from the reference sample) to 5 (much stronger than the reference sample).

EXAMPLE 3

LAD Containing 2.5% by Volume of Alcohol

A panel of consumers made up of 14 or 15 participants was offered and invited to assess the flavor of a beverage consisting of 80 g/l of sugar, 2 g/l of citric acid, 26 ml/l of alcohol, 96% by volume, and water, to which various amounts of PMF84 were added. The reference used was the beverage without the addition of PMF84.

Assessment of the Effect of the Intensification of the Alcoholic Flavor Compared to the Reference Sample

|  | Addition of PMF84 | | | | | |
|---|---|---|---|---|---|---|
| Description | 1 ppm | 2 ppm | 5 ppm | 10 ppm | 20 ppm | |
| None | 7 | 5 | 3 | 2 | 1 | Number of test persons |
| Relatively slight | 3 | 3 | 0 | 0 | 1 | |
| Slight to moderate | 4 | 6 | 8 | 7 | 6 | |
| Moderate to strong | 0 | 0 | 3 | 6 | 7 | |

Summary of the Results of the Tasting

The optimum intensification of the alcoholic flavor in this application example is in the range of from 5-10 ppm. On addition of from 1-2 ppm, only a small portion of the test persons said that they could detect an intensified alcoholic flavor. On addition of 20 ppm of PMF84, the participants describe a sharp, pungent note, but also a markedly intensified detection of the alcohol flavor.

EXAMPLE 4

Beer Containing 5% by Volume of Alcohol

A panel of consumers made up of 14 participants was offered and invited to assess the flavor of a beverage consisting of 900 ml/l of alcohol-free beer, 52 ml/l of alcohol, 96% by volume, carbonated water, to which various amounts of PMF84 were added. The reference used was the beverage without the addition of PMF84.

Assessment of the Effect of the Intensification of the Alcoholic Flavor Compared to the Reference Sample

|  | Addition of PMF84 | | | | | |
|---|---|---|---|---|---|---|
| Description | 1 ppm | 2 ppm | 5 ppm | 10 ppm | 20 ppm | |
| None | 6 | 6 | 5 | 4 | 3 | Number of test persons |
| Relatively slight | 6 | 3 | 3 | 4 | 4 | |
| Slight to moderate | 2 | 4 | 4 | 3 | 5 | |
| Moderate to strong | 0 | 1 | 2 | 3 | 2 | |

Summary of the Results of the Tasting

The optimum intensification of the alcoholic flavor in this application example is in the range of from 5-20 ppm. On addition of from 1-5 ppm, only a small portion of the test persons said that they could detect an intensified alcoholic flavor. The test persons also described an intensification of the tingling, refreshing flavor and also a slight bitterness and an intensification of the hops note.

EXAMPLE 5

Liqueur Containing 20% by Volume of Alcohol

A panel of consumers made up of 14 participants was offered and invited to assess the flavor of a beverage consisting of 190 g/l of sugar, 207 ml/l of alcohol, 96% by volume, and water, to which various amounts of PMF84 were added. The reference used was the beverage without the addition of PMF84.

Assessment of the Effect of the Intensification of the Alcoholic Flavor Compared to the Reference Sample

|  | Addition of PMF84 | | | | | |
|---|---|---|---|---|---|---|
| Description | 1 ppm | 2 ppm | 5 ppm | 10 ppm | 20 ppm | |
| None | 5 | 1 | 0 | 1 | 1 | Number of test persons |
| Relatively slight | 7 | 7 | 0 | 2 | 4 | |
| Slight to moderate | 1 | 5 | 11 | 9 | 8 | |
| Moderate to strong | 1 | 1 | 3 | 2 | 1 | |

Summary of the Results of the Tasting

The optimum intensification of the alcoholic flavor in this application example is in the range of 5 ppm. On addition of from 1-2 ppm, only a small portion of the test persons said that they could detect an intensified alcoholic flavor. Furthermore, from an addition of 5 ppm, the beverage is described as being sweeter, but also slightly more bitter.

EXAMPLE 6

Vodka Containing 37.5% by Volume of Alcohol

A panel of consumers made up of 14 participants was offered and invited to assess the flavor of a beverage consisting of vodka (Smirnoff Vodka brand), 37.5% by volume, and water, to which various amounts of PMF84 were added. The reference used was the beverage without the addition of PMF84.

Assessment of the Effect of the Intensification of the Alcoholic Flavor Compared to the Reference Sample

|  | Addition of PMF84 | | | | | |
|---|---|---|---|---|---|---|
| Description | 1 ppm | 2 ppm | 5 ppm | 10 ppm | 20 ppm | |
| None | 5 | 2 | 1 | 2 | 2 | Number of test persons |
| Relatively slight | 4 | 1 | 0 | 0 | 0 | |
| Slight to moderate | 4 | 9 | 11 | 9 | 7 | |
| Moderate to strong | 1 | 3 | 2 | 3 | 5 | |

Summary of the Results of the Tasting

The optimum intensification of the alcoholic flavor in this application example is in the range of from 2-5 ppm. On addition of increased amounts of PMF, the test persons note a burning, pungent flavor.

Specific Embodiments

Specific embodiment one comprises a use of a compound of Formula I or of a mixture of compounds of Formula I:

(Formula I)

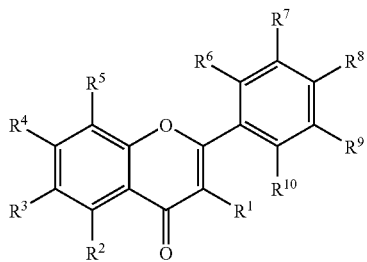

wherein $R^1$ to $R^{10}$ each independently of one another represent H, methoxy or ethoxy and at least one of the radicals $R^1$ to $R^{10}$ represents methoxy or ethoxy to intensify the sensory impression, in particular the flavor impression, of alcohol.

Specific embodiment two comprises the use as in specific embodiment one, wherein at least one compound of Formula I is selected from the group consisting of compounds of Formulae II to VI:

(Formula II)

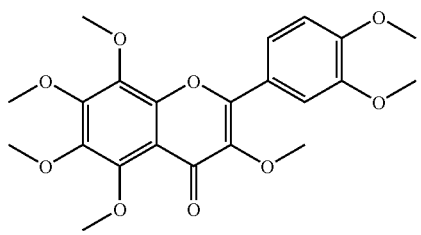

(Formula III)

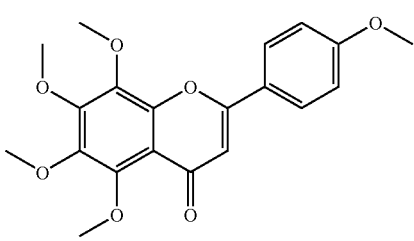

(Formula IV)

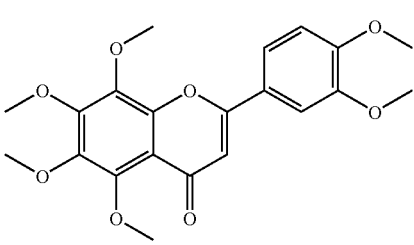

(Formula V)

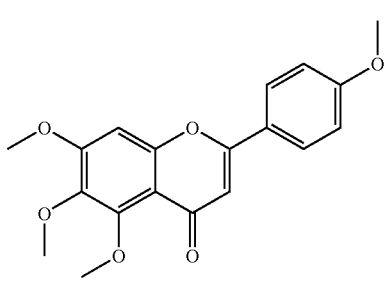

(Formula VI)

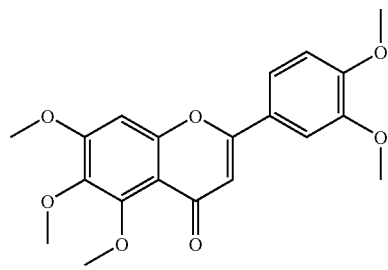

Specific embodiment three comprises a liquid mixture comprising ethanol and a compound of Formula I or a mixture of compounds of Formula I:

(Formula I)

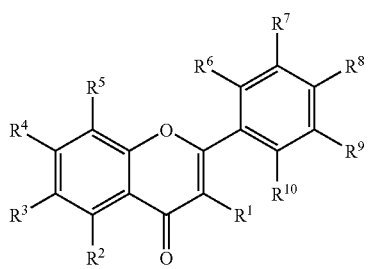

wherein $R^1$ to $R^{10}$ each independently of one another represent H, methoxy or ethoxy and at least one of the radicals $R^1$ to $R^{10}$ represents methoxy or ethoxy and wherein the ethanol content based on the volume of the liquid mixture is 0.1 to 50% by volume and the total amount of compounds of Formula I based on the liquid mixture is 1 to 20 ppm on the condition that the mixture comprises no orange juice.

Specific embodiment four comprises the liquid mixture as in specific embodiment three, wherein the mixture comprises no juice from citrus fruits.

Specific embodiment five comprises the liquid mixture as in one of specific embodiments three or four, wherein the compounds of Formula I are substantially one or more of the compounds of Formulae II to VI (Formula II)

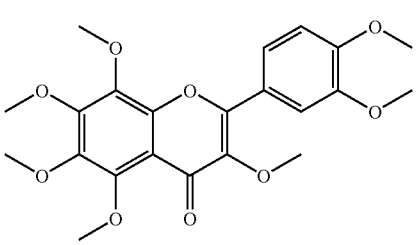

(Formula III)

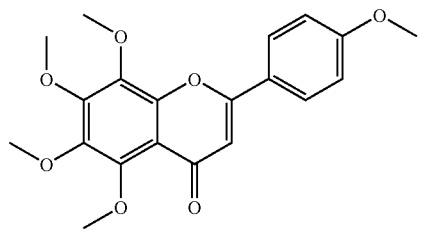

(Formula IV)

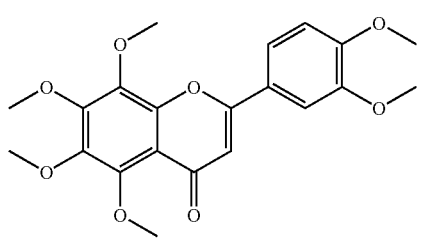

(Formula V)

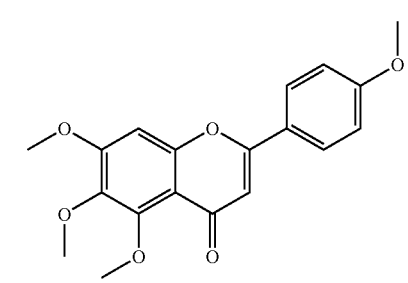

(Formula VI)

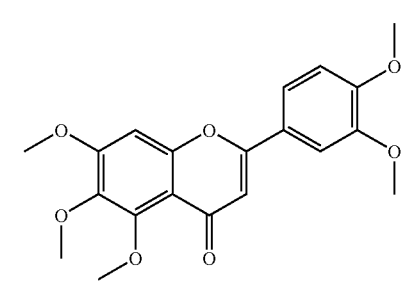

Specific embodiment six comprises the liquid mixture as in one of specific embodiments three to five, wherein the mixture is a beverage intended for human consumption.

Specific embodiment seven comprises a candy comprising a liquid mixture as in one of specific embodiments three to five.

Specific embodiment eight comprises a method for producing an intensified ethanol flavor impression, including the steps of:
a) preparing ethanol or an ethanol-containing mixture,
b) adding a compound of Formula I or a mixture of compounds of Formula I in an amount so as to intensify the flavor impression of ethanol,
on the condition that in step b) no orange juice, preferably no juice from citrus fruits is used.

Specific embodiment nine comprises a method for producing a beverage or a solid food product, including a method as in specific embodiment eight.

We claim:

1. A method for intensifying a sensory impression of alcohol comprising adding to the alcohol 2 ppm to 20 ppm of a compound of Formula I or of a mixture of compounds of Formula I:

(Formula I)

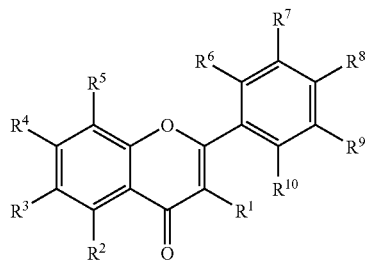

wherein $R^1$ to $R^{10}$ each independently of one another represent H, methoxy or ethoxy and at least one of the radicals $R^1$ to $R^{10}$ represents methoxy or ethoxy to intensify the sensory impression of alcohol.

2. The method as claimed in claim 1, wherein at least one compound of Formula I is selected from the group consisting of compounds of Formulae II to VI:

(Formula II)

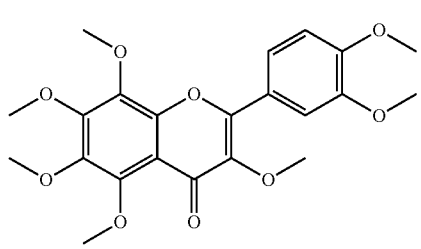

(Formula III)

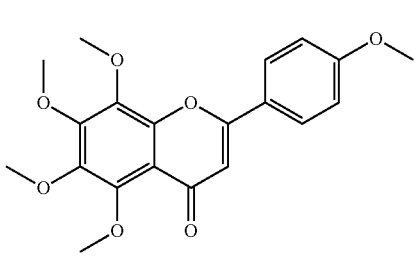

(Formula IV)

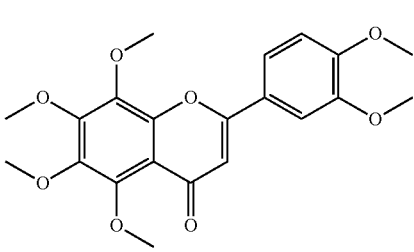

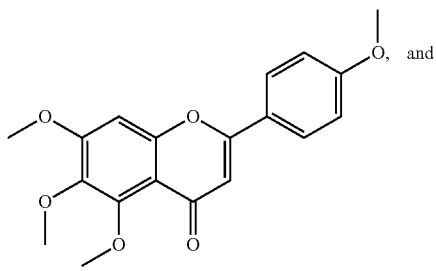
(Formula V)

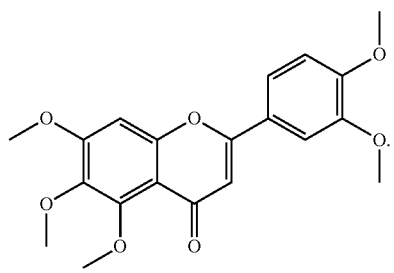
(Formula VI)

3. A liquid mixture comprising ethanol and 2 ppm to 20 ppm of a compound of Formula I or a mixture of compounds of Formula I:

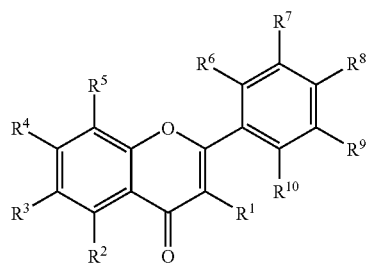
(Formula I)

wherein $R^1$ to $R^{10}$ each independently of one another represent H, methoxy or ethoxy and at least one of the radicals $R^1$ to $R^{10}$ represents methoxy or ethoxy and wherein the ethanol content based on the volume of the liquid mixture is 0.1 to 50% by volume with the proviso that the mixture comprises no orange juice.

4. The liquid mixture as claimed in claim 3, wherein the mixture comprises no juice from citrus fruits.

5. The liquid mixture as claimed in claim 3, wherein the compounds of Formula I are substantially one or more of the compounds of Formulae II to VI

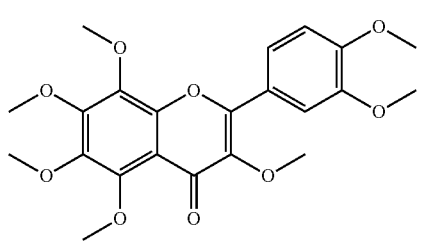
(Formula II)

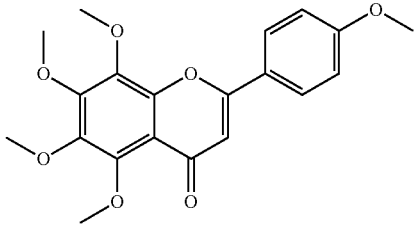
(Formula III)

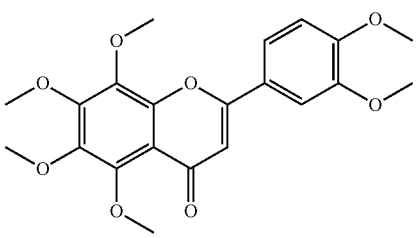
(Formula IV)

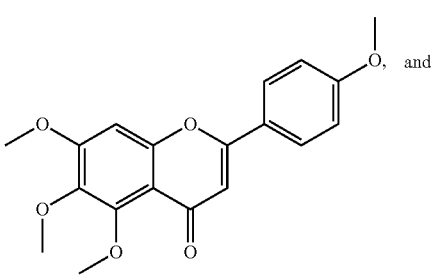
(Formula V)

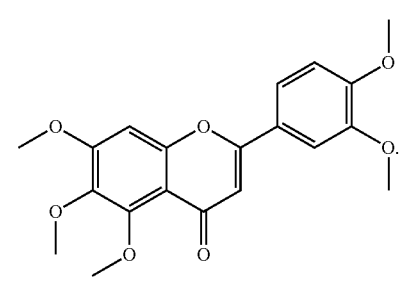
(Formula VI)

6. The liquid mixture as claimed in claim 3, wherein the mixture is a beverage intended for human consumption.

7. A candy comprising a liquid mixture as claimed in claim 3.

8. A method for producing an intensified ethanol flavor impression, including:
   a) preparing ethanol or an ethanol-containing mixture and
   b) adding 2 ppm to 20 ppm of a compound of Formula I or a mixture of compounds of Formula I to intensify the flavor impression of ethanol,
   with the proviso that in b) no orange juice is used.

9. A method for producing a beverage or a solid food product, comprising producing an intensified ethanol flavor impression, including:
   a) preparing ethanol or an ethanol-containing mixture and
   b) adding 2 ppm to 20 ppm of a compound of Formula I or a mixture of compounds of Formula I to intensify the flavor impression of ethanol,
   with the proviso that in b) no orange juice is used, and
   adding the mixture to a beverage or a solid food product.

10. The method of claim 1, wherein the sensory impression is a flavor impression.

11. The method of claim 8, further comprising that no juice from citrus fruits is used in b).

12. The method of claim 1, comprising adding to the alcohol the compound of Formula II

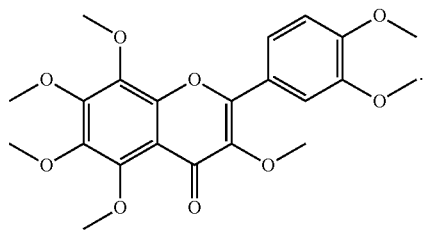

(Formula II)

13. The liquid mixture of claim 5, wherein the liquid mixture comprises the compound of Formula II.

14. The liquid mixture of claim 13, wherein the liquid mixture comprises at least 30% by weight of the compound of Formula II based on the total weight of the compounds of Formula I.

15. The liquid mixture of claim 14, wherein the liquid mixture comprises at least 60% by weight of the compound of Formula II based on the total weight of the compounds of Formula I.

16. The method of claim 1, comprising adding to the alcohol a mixture of compounds of Formula I, wherein the mixture of compounds of Formula I comprises:

(a) a compound of Formula II

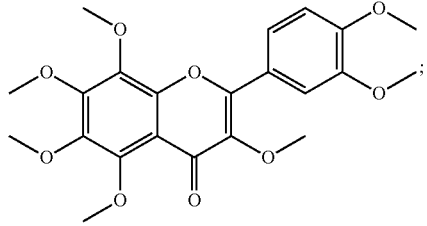

(Formula II)

(b) a compound of Formula III

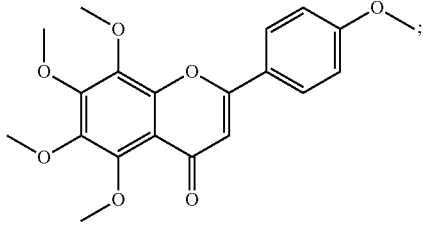

(Formula III)

(c) a compound of Formula IV

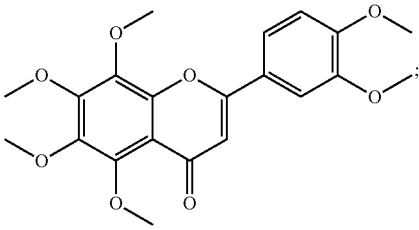

(Formula IV)

and (d) a compound of Formula VI

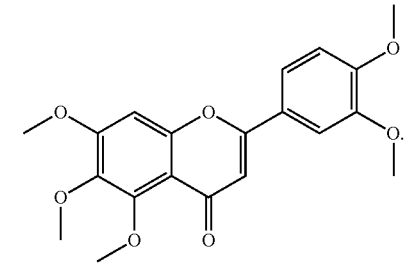

(Formula VI)

* * * * *